United States Patent [19]
Gmelin

[11] Patent Number: 6,148,797
[45] Date of Patent: Nov. 21, 2000

[54] MOUNTING DEVICE FOR MOUNTING FUEL INJECTION VALVES

[75] Inventor: Karl Gmelin, Flein, Germany

[73] Assignee: Robert Bosch GmbH, Stuttgart, Germany

[21] Appl. No.: 09/367,622

[22] PCT Filed: Sep. 23, 1998

[86] PCT No.: PCT/DE98/02817

§ 371 Date: Nov. 3, 1999

§ 102(e) Date: Nov. 3, 1999

[87] PCT Pub. No.: WO99/31381

PCT Pub. Date: Jun. 24, 1999

[30] Foreign Application Priority Data

Dec. 17, 1997 [DE] Germany .......................... 197 56 102

[51] Int. Cl.[7] .................................................. F02M 37/04
[52] U.S. Cl. .......................................... 123/456; 123/470
[58] Field of Search .................................. 123/456, 468, 123/469, 470, 472

[56] References Cited

U.S. PATENT DOCUMENTS

| | | | |
|---|---|---|---|
| 4,240,384 | 12/1980 | Urbinati et al. ........................ | 123/470 |
| 4,294,215 | 10/1981 | Hans et al. ............................... | 123/469 |
| 5,074,269 | 12/1991 | Herbon et al. . | |
| 5,123,399 | 6/1992 | Motoyama et al. . | |
| 5,771,863 | 6/1998 | Daly ........................................ | 123/456 |

FOREIGN PATENT DOCUMENTS

| | | |
|---|---|---|
| 22 08 646 | 8/1973 | Germany . |
| 8-312503 | 11/1996 | Japan . |

*Primary Examiner*—Thomas N. Moulis
*Attorney, Agent, or Firm*—Kenyon & Kenyon

[57] ABSTRACT

A mounting device for mounting fuel injectors, for directly injecting fuel into a combustion chamber of an internal combustion engine, and a fuel distribution line, on a cylinder head of the internal combustion engine. The mounting device includes spring elements, which extend between a spring retainer of the fuel distribution line allocated to each fuel injector, and a spring retainer of the allocated fuel injector. The mounting device further includes a mounting bracket, common to all the fuel injectors, which extends from a mounting-bracket receiver of the fuel distribution line to mounting-bracket receiver of the fuel injectors. The spring elements brace the fuel distribution line and the fuel injectors against each other in such a way that the fuel distribution line and the fuel injectors are held in force-locking contact in their allocated mounting-bracket receivers, and after compressing the spring elements, the mounting bracket can be loosened and removed.

10 Claims, 2 Drawing Sheets

MOUNTING DEVICE FOR MOUNTING FUEL INJECTION VALVES

FIELD OF THE INVENTION

The present invention relates to a mounting device and method for mounting fuel injectors and a fuel distribution line on a cylinder head of an internal combustion engine.

BACKGROUND INFORMATION

Japanese Patent No. 08 312503 describes providing a cylinder head of an internal combustion engine with receiving boreholes for one fuel injector per combustion chamber of the internal combustion engine, into which one spray-discharge section of the associated fuel injector can be inserted for directly injecting fuel into the respective combustion chamber. The fuel injector inserted into the receiving borehole of the cylinder head is held down against the relatively high combustion pressure prevailing in the combustion chamber with the aid of a holding-down device designed as a clamping shoe. For supplying the fuel to an inlet section with a fuel inlet port which is provided in each fuel injector, Japanese Patent No. 08 312503 provides a fuel distribution line that connects the fuel injectors to a fuel pump. The fuel distribution line has one fuel outlet port for each fuel injector. To achieve the necessary seal, in each case one sealing element is provided in the form of an O-ring.

However, a disadvantage of this known mounting method is, that the fuel injectors must be mounted individually on the cylinder head, which requires a considerable outlay for assembly involving several procedures. Preliminary testing of the fuel-injection system, e.g., for imperviousness, is not possible. The multitude of operations makes fully automated manufacture more difficult.

SUMMARY OF THE INVENTION

The mounting device of the present invention has the advantage that all the fuel injectors, together with the fuel distribution line, can be preassembled on the mounting bracket common to all the fuel injectors. Therefore, the fuel-injection system including the fuel distribution line and the fuel injectors can be preassembled as a complete module by the manufacturer of the fuel-injection system. The pre-assembled module can then be quickly mounted on the internal combustion engine without a greater outlay for assembly, e.g., by a fully automated manufacturing facility, at the factory of the manufacturer of the internal combustion engine. To that end, it is only necessary to insert the fuel injectors into the receiving boreholes provided on the cylinder head of the internal combustion engine, and to connect the fuel distribution line to the cylinder head, e.g., by a screw connection. In doing this, the spring elements are compressed or strained that the mounting bracket can be loosened and removed. The mounting bracket can be reused for the preassembly of a new module composed of fuel distribution line and fuel injectors.

A further advantage is that the fuel-injection system can already be pretested at the factory of the fuel-injection system manufacturer for proper functioning, particularly for absolute imperviousness, especially in the connecting region between the fuel injectors and the fuel distribution line. This preliminary test ensures that only perfectly functioning fuel-injection systems are supplied to the manufacturer of the internal combustion engine, and thus the overall reliability of the fuel-injection systems is improved.

The described advantages also apply analogously to the method according to the present invention for mounting fuel injectors and a fuel distribution line.

Intermediate sleeves, which can be joined to the fuel distribution line and the fuel injectors in a sealing and—within predefined limits—flexible manner, can be advantageously arranged between the fuel outlet ports of the fuel distribution lines and the fuel inlet ports of the fuel injectors. In this manner, slight deviations in the position of the fuel inlet ports and the receiving boreholes on the cylinder head for the allocated fuel injector can be compensated by the intermediate sleeves. Consequently, it is possible to place lower demands on the manufacturing tolerances for the positions of the fuel outlet ports of the fuel distribution lines and of the receiving boreholes on the cylinder head, so that manufacturing costs can be reduced. In this context, the spring elements, as spiral springs, can surround the intermediate sleeve, so that, an extremely compact design results. Furthermore, the intermediate sleeves can be fixed in position on the fuel distribution line in a particularly advantageous manner by securing elements. Using the securing elements, the intermediate sleeves can be pre-mounted on the fuel distribution line prior to inserting the spring elements and before assembling the fuel injectors, the fuel distribution line and the mounting bracket. Handling and ease of assembly are thus further improved. The securing elements can be joined simply and effectively to the fuel distribution line, or alternatively, even to the fuel injectors, using detent connections.

DETAILED DESCRIPTION

Figure 1:
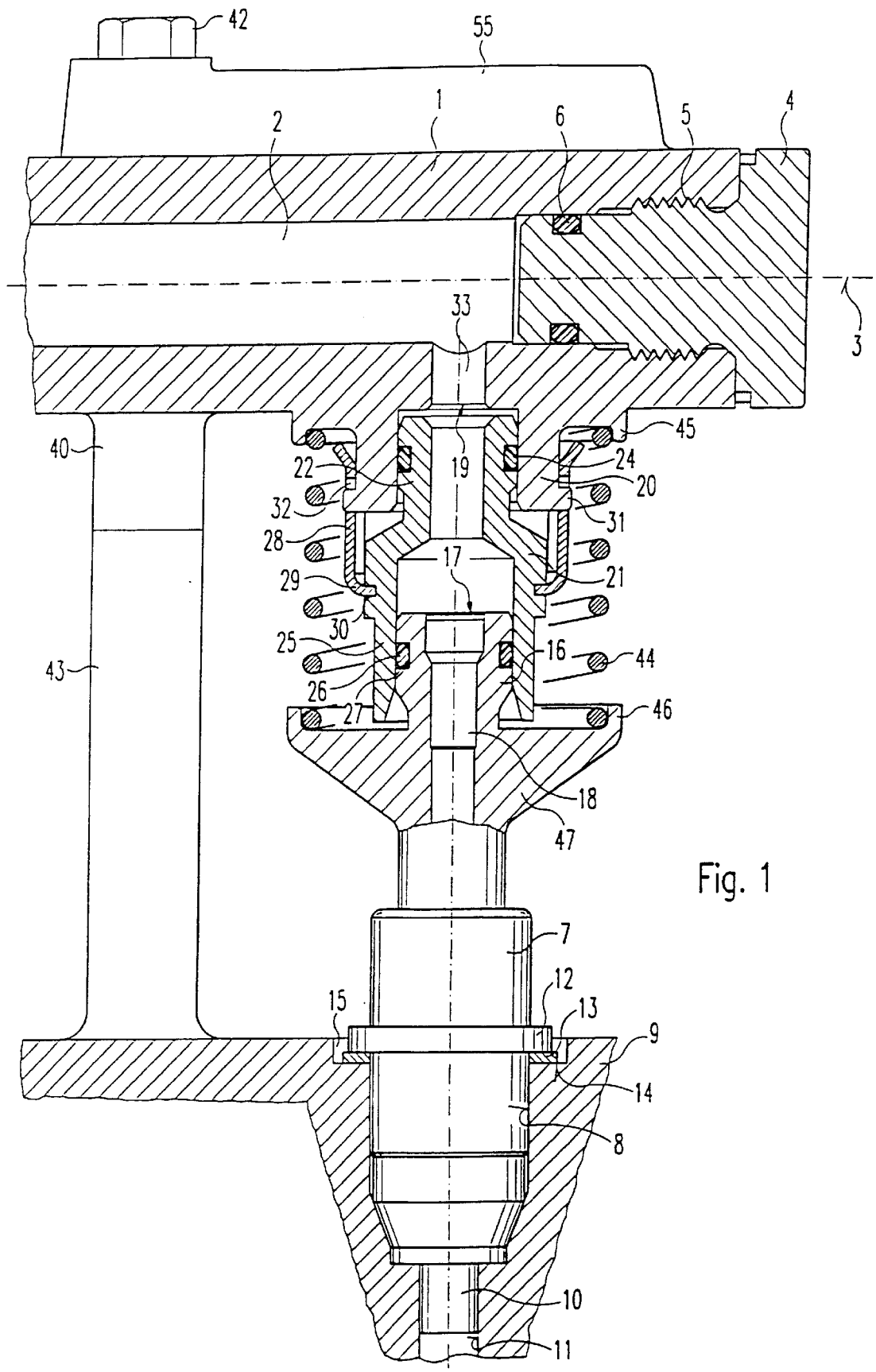
FIG. 1 shows a partial section through a fuel distribution line, an intermediate sleeve and a fuel injector, which is mounted on a cylinder head of an internal combustion engine.

FIG. 1 shows a partial representation of a fuel distribution line 1 in which a longitudinal borehole 2 is formed extending along a longitudinal axis 3. At the end of fuel distribution line 1 which can be seen in FIG. 1, longitudinal borehole 2 is occluded by a closure element 4 that is inserted into longitudinal borehole 2, for example, the closure element 4 may be screwed in with the assistance of a thread 5. Closure element 4 has a sealing element 6, for example, in the form of an O-ring, for sealing off fuel distribution line 1.

FIG. 1 also shows a partial representation of a fuel injector 7 that is inserted into a receiving borehole 8 of cylinder head 9; for example, receiving borehole 8 may be designed as a stepped borehole. A spray-discharge section 10 projects into the end section 11 of receiving borehole 8. The end section 11 discharges into a combustion chamber of an internal combustion engine. At least one spray orifice for injecting the fuel directly into the allocated combustion chamber of the internal combustion engine is formed in known manner on spray-discharge section 10 of fuel injector 7. Furthermore, fuel injector 7 has a collar 12 that rests via a bearing ring 13 on bottom surface 14 of an enlargement 15 of receiving borehole 8.

At an inlet section 16, fuel injector 7 has a fuel inlet port 17 for a fuel line 18 inside fuel injector 7. Each fuel injector 7 is assigned a fuel outlet port 19 on fuel distribution line 1. Fuel outlet port 19 of fuel distribution line 1 is surrounded by a pipe coupling 20. In the embodiment shown in FIG. 1, an intermediate sleeve 21 is located between fuel outlet port 19 of fuel distribution line 1 and fuel inlet port 17 of each fuel injector 7. Alternatively, however, it is also possible within the scope of the present invention to insert inlet section 16 of fuel injector 7 directly into pipe coupling 20 of fuel distribution line 1, so that fuel inlet port 17 of fuel injector 7 immediately adjoins fuel outlet port 19 of fuel distribution line 1.

In the embodiment shown in FIG. 1, however, each fuel injector 7 is provided with one intermediate sleeve 21 which, within certain limits, allows for a flexible connection of fuel outlet port 19 of fuel distribution line 1 to fuel inlet port 17 of fuel injector 7. Deviations, caused by manufacturing and assembling tolerances, in the positions of fuel outlet ports 19 formed on fuel distribution line 1 relative to the positions of receiving boreholes 8 formed on cylinder head 9 can thus be compensated, so that on the one hand, ease of assembly is improved, and on the other hand, it is possible to place lower demands on the manufacturing tolerances for the positioning of fuel outlet ports 19 and receiving boreholes 8, respectively. In the embodiment shown, connecting pieces 20 are designed so that they surround an inlet section 22 of intermediate sleeve 21 in a cup-like fashion. A sealing element 24, for example in the form of an O-ring, which is inserted into a groove, is provided for sealing. Downstream of inlet section 22, intermediate sleeve 21 has an enlargement 25 that surrounds inlet section 16 of fuel injector 7 in a cup-like fashion. A sealing element 26, preferably in the form of an O-ring which is inserted into a groove 27, is provided here for sealing, as well.

A securing element 28, which surrounds connecting piece 20 and the inlet-side area of intermediate sleeve 21 on three sides, is provided for premounting intermediate sleeve 21. Securing element 28, at an end 29 facing away from fuel distribution line 1, is inserted into a groove 30 of intermediate sleeve 21. Connecting piece 20 has a detent 31 on two opposite sides, which can be snapped into an opening 32 of securing element 28. In this manner, intermediate sleeves 21 can be premounted on fuel distribution line 1 prior to mounting fuel injectors 7 and the mounting device according to the present invention, which is still to be described.

Fuel outlet port 19 is connected to longitudinal borehole 2 of fuel distribution line 1 via a connecting duct 33. Arranged along longitudinal axis 3 of fuel distribution line 1, staggered relative to each other, are a plurality of, e.g. four, fuel injectors 7, each of which is connected to longitudinal borehole 2 of fuel distribution line 1 via an intermediate sleeve 21 and a fuel outlet port 19 allocated to fuel injector 7 via a connecting duct 33. Fuel distribution line 1 is used to supply fuel to all fuel injectors 7.

Fuel distribution line 1 is joined to cylinder head 9, for example, by a screw connection. In the embodiment shown, fuel distribution line 1 has a holding connector 40 that is offset with respect to the sectional plane of FIG. 1 and has a longitudinal borehole 41, which is more visible in FIG. 2. In the embodiment shown, a screw protrudes through longitudinal borehole 41; however, only screwhead 42 is visible in FIG. 1. Using this screw, a screw connection is created with a holding base 43 that is either formed in one piece with cylinder head 9, or is permanently joined to it, for example, by welding. Such a screw connection is provided for each fuel injector 7.

By tightening the screw connection, a force-locking connection is created between fuel distribution line 1 and fuel injector 7 via intermediate sleeve 21, so that fuel injector 7 is pressed into receiving borehole 8 of cylinder head 9. During the operation of the internal combustion engine, fuel injector 7 is held down against the combustion pressure in the associated combustion chamber of the internal combustion engine by the force-locking connection provided by holding base 43, holding connector 40, fuel distribution line 1 and intermediate sleeve 21. Additional clamping shoes, as are used in the conventional mounting of fuel injectors 7 on cylinder head 9, are not needed.

A plurality of holding connectors 40 and holding bases 43 may be provided along fuel distribution line 1. In particular, each fuel injector 7 can be assigned one holding base 43 and one holding connector 40.

FIG. 1 also shows a spring element 44 in the form of a spiral spring, which is part of the mounting device of the present invention yet to be described in more detail. Such a spring element 44 is provided for each fuel injector 7. Spring element 44 extends between a spring retainer 45 of fuel distribution line 1 and a spring retainer 46 of fuel injector 7, opposite of spring retainer 45. In the embodiment shown, spring retainers 45 and 46 are designed as ring-shaped holding devices that surround connecting piece 20 of fuel distribution line 1 and fuel line 18 of fuel injector 7, respectively, like a plate. Spring retainers 45 and 46 are used to fix spring element 44 axially and radially in position. Spring element 44 is slipped over intermediate sleeve 21 prior to inserting inlet section 16 of fuel injector 7 into intermediate sleeve 21. Consequently, in the embodiment shown, spring element 44 surrounds intermediate sleeve 21, resulting in a particularly compact design. In an embodiment in which inlet section 16 of fuel injector 7 is inserted directly into connecting piece 20 of fuel distribution line 1, either spring element 44 must be made shorter or connecting piece 20 must be made longer.

To produce an effective support for the spring tension applied by spring element 44, fuel injector 7 has a conical section 47 which securely supports spring retainer 46.

Figure 2:
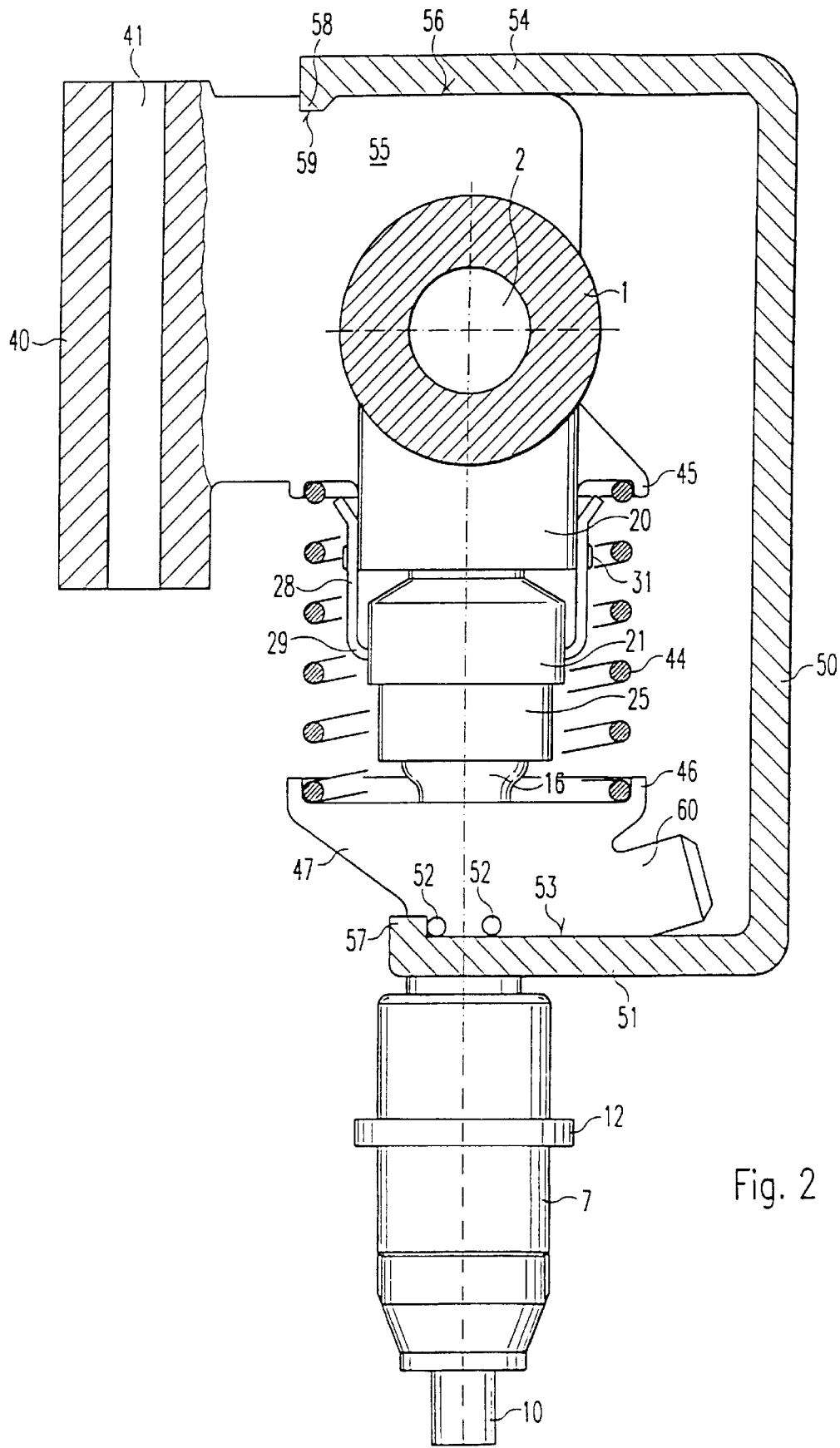
FIG. 2 shows a lateral view of the fuel distribution line, the intermediate sleeve, and the fuel injector, depicted in FIG. 1, after pre-assembly on a mounting bracket.

The of the mounting device method according to the present invention will now be explained using FIG. 2. FIG. 2 shows a side view of the exemplary embodiment shown in FIG. 1. In contrast to FIG. 1, however, the final assembled state of fuel distribution line 1 and fuel injectors 7 is not shown; instead, a preassembled state is shown in which fuel injectors 7 and intermediate sleeves 21 are preassembled on fuel distribution line 1. To that end, provision is made for a mounting bracket 50, which is common to all the fuel injectors 7. In the embodiment shown, mounting bracket 50 has a U-shaped cross-sectional profile. Mounting bracket 50 can extend, as a profile body having a constant cross-section, over the entire fuel distribution line 1. However, for example, it is also possible for the mounting bracket to have a ribbed design, and to assign one receiving arm to each fuel injector 7. Other varied embodiments are also conceivable.

A first leg 51 of mounting bracket 50, which has a U-shaped design in the exemplary embodiment shown, is used to receive fuel injectors 7. For that purpose, fuel injectors 7 have a mounting-bracket receiver 52, which, in the embodiment shown, is composed of two integrally molded pins. However, mounting-bracket receivers 52 of other designs, for example, in the form of a lip, a saucer-shaped projection, a collar, or the like, are also conceivable. Mounting-bracket receiver 52 abuts flush against inner surface 53 of first leg 51 of mounting bracket 50, and is pressed or held in contact by spring element 44. First leg 51 of mounting bracket 50 fans out like a fork in the area of fuel injector 7, so that it surrounds fuel injector 7 on both sides. A mounting-bracket receiver 52 is also integrally molded on the side of fuel injector 7 which is hidden in FIG. 2.

A second leg 54 of mounting bracket 50, opposite first leg 51, is used for the contact of mounting bracket 50 against a reinforcement 55 on the side of fuel distribution line 1 facing away from fuel injectors 7. In this context, surface 56 of reinforcement 55 is used as a mounting-bracket receiver of fuel distribution line 1. Consequently, mounting bracket 50 extends from surface 56 of reinforcement 55 of fuel distribution line 1, used as a mounting-bracket receiver, to mounting-bracket receivers 52 of fuel injectors 7. Fuel distribution line 1, intermediate sleeves 21 and fuel injectors 7 are clamped between the two legs 51 and 54 of mounting bracket 50 by spring elements 44.

The preassembly is carried out so that intermediate sleeves 21 are inserted into connecting pieces 20 of fuel distribution line 1, and are anchored by securing elements 28 at detents 31. Spring elements 44 are subsequently slipped over intermediate sleeves 21. Finally, fuel injectors 7 are inserted into intermediate sleeves 21. Ultimately, mounting bracket 50 is mounted by slightly compressing spring elements 44 so that mounting-bracket receiver 52, which is pin-like in the exemplary embodiment, can be guided over projection 57 of first leg 51 of mounting bracket 50. Second leg 54 also has a projection 58 that engages a recess 59 on surface 56 of reinforcement 55. In this manner, fuel distribution line 1 and fuel injectors 7 are securely fixed in position on mounting bracket 50.

The module of the fuel-injection system preassembled in this manner can now be subjected to a preliminary test. This preliminary test can relate particularly to a check test for imperviousness at all junctions to be sealed off. Furthermore, a functional test can also be carried out. For that purpose, jacks with cables for electrically actuating fuel injectors 7 can be slipped on plug connectors 60 of fuel injectors 7. By electrically actuating fuel injectors 7, it is possible to check whether all fuel injectors 7 are functioning properly.

A particular advantage is that the module, composed of fuel distribution line 1 and fuel injectors 7, can be completely preassembled at the plant of the manufacturer of the fuel-injection system and be delivered to the manufacturer of the internal combustion engines as a complete module. The final assembly steps are limited to inserting fuel injectors 7 into receiving boreholes 8 of cylinder head 9 and producing the screw connection between fuel distribution line 1 and cylinder head 9. To that end, screws must be inserted into longitudinal borehole 41 of fuel distribution line 1 and screwed into a thread provided inside holding base 43. In this manner, fuel distribution line 1, intermediate sleeves 21 and fuel injectors 7 are brought into force-locking contact, so that fuel injectors 7 are pressed into receiving boreholes 8 of cylinder head 9. In the process, spring elements 44 are compressed, i.e., further strained, so that the distance between mounting-bracket receivers 52 of fuel injectors 7 and surface 56 of reinforcement 55, which is used as a mounting-bracket receiver of fuel distribution line 1, is reduced. In the final assembled state of the fuel-injection system, mounting bracket 50 can therefore be released and removed. Mounting bracket 50 is then available for the preassembly of a new fuel-injection system.

What is claimed is:

1. A mounting device for mounting a plurality of fuel injectors and a fuel distribution line on a cylinder head of an internal combustion engine, the fuel injectors directly injecting a fuel into a combustion chamber of the internal combustion chamber, the device comprising:

a plurality of spring elements, each of the plurality of spring elements extending between an associated one of a first plurality of spring retainers of the fuel distribution line and an associated one of a second plurality of spring retainers of a corresponding one of the fuel injectors; and a mounting-bracket arranged with respect to the plurality of fuel injectors, the mounting-bracket extending from a mounting-bracket receiver of the fuel distribution line to each one of a plurality mounting-bracket receivers associated with the fuel injectors, wherein:

the fuel distribution line and the fuel injectors are braced against each other such that the fuel distribution line is held in a force-locking contact with the mounting-bracket receiver associated therewith and each one of the fuel injectors is held in a force-locking contact with a corresponding one of the plurality of mounting-bracket receivers associated therewith, and after each one of the plurality of spring elements is placed under a compressive force the mounting-bracket becomes removable.

2. The mounting device according to claim 1, further comprising:

a plurality of intermediate sleeves, each of the intermediate sleeves being arranged between the fuel distribution line and one of the fuel injectors, each of the intermediate sleeves being sealingly and flexibly coupled within predefined limits to a fuel inlet port of the one of the fuel injectors and an outlet port of the fuel distribution line corresponding to the one of the fuel injectors.

3. The mounting device according to claim 2, wherein each of the spring elements includes a spiral spring surrounding one of the intermediate sleeves.

4. The mounting device according to claim 2, wherein the intermediate sleeves are affixed on the fuel distribution line by securing elements.

5. The mounting device according to claim 4, wherein the securing elements are joined to at least one of the fuel distribution line and the fuel injectors using detent connectors.

6. The mounting device according to claim 1, wherein each one of the spring retainers of the fuel distribution line and each one of the spring retainers of the fuel injectors includes a ring-shaped holding device arranged on the fuel distribution line and the fuel injectors opposite each other in an assembled state.

7. The mounting device according to claim 1, wherein the fuel distribution line is connected to the cylinder head by screw connections, the spring elements being compressed by a tightening of the screw connections.

8. A method for mounting a plurality of fuel injectors and a fuel distribution line on a cylinder head of an internal combustion engine, the fuel injectors directly injecting a fuel into a combustion chamber of the internal combustion engine, the method comprising the steps of:

for each of the fuel injectors, inserting a corresponding one of a plurality of spring elements between one of a plurality of spring retainers of the fuel distribution line and one of a plurality of spring retainers of the fuel injectors;

preassembling the fuel injectors on a mounting bracket associated with each of the fuel injectors, the mounting-bracket extending from a mounting-bracket receiver of the fuel distribution line to each one of a plurality of mountain bracket receivers associated with the fuel injectors;

inserting spray discharge sections of the fuel injectors into corresponding receiving boreholes of the cylinder head;

connecting the fuel distribution line to the cylinder head;

compressing each of the spring elements; and removing the mounting-bracket.

9. The method according to claim 8, wherein the step of preassembling includes the step of:

inserting each one of a plurality of intermediate sleeves between an associated one of a plurality of fuel outlet ports of the fuel distribution line and a fuel inlet port of an associated one of the fuel injectors, the intermediate sleeves sealingly and flexibly connecting within pre-defined limits the each one of inlet ports and to an associated one of the outlet ports.

10. The method according to claim 8, further comprising the step of:

joining the fuel distribution line to the cylinder head by a screw connection for compressing the spring elements in order to cause the mounting-bracket to become removable.

* * * * *

UNITED STATES PATENT AND TRADEMARK OFFICE
CERTIFICATE OF CORRECTION

PATENT NO. : 6,148,797
DATED : November 21, 2000
INVENTOR(S) : Karl Gmelin

It is certified that error appears in the above-identified patent and that said Letters Patent is hereby corrected as shown below:

Column 1,
Line 52, after "... strained ..." insert -- so --.

Column 2,
Line 42, change " ... line 1 which ..." to -- line 1, which --.

Column 4,
Line 35, after "The ..." (first occurrence) insert -- method --.

Signed and Sealed this

Sixth Day of November, 2001

Attest:

*Nicholas P. Godici*

NICHOLAS P. GODICI
*Attesting Officer*       *Acting Director of the United States Patent and Trademark Office*